US007494719B2

(12) United States Patent
Affeldt et al.

(10) Patent No.: US 7,494,719 B2
(45) Date of Patent: Feb. 24, 2009

(54) COMPONENT WITH A PLATINUM-ALUMINUM SUBSTRATE AREA, PLATINUM-ALUMINUM COATING AND PRODUCTION METHOD

(75) Inventors: Ernst Affeldt, Dachau (DE); Anja Kliewe, München (DE); Lothar Peichl, Dachau (DE); Heinrich Walter, Friedberg (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 10/759,112

(22) Filed: Jan. 20, 2004

(65) Prior Publication Data

US 2008/0233427 A1 Sep. 25, 2008

(30) Foreign Application Priority Data

Oct. 30, 2003 (DE) ................................ 103 50 727

(51) Int. Cl.
*B32B 15/20* (2006.01)
*B32B 15/04* (2006.01)
*C22F 1/18* (2006.01)

(52) U.S. Cl. ........................ 428/652; 428/650; 428/670; 428/941; 427/252; 427/585; 148/516; 148/527; 148/535; 416/241 R

(58) Field of Classification Search ................. 428/650, 428/651, 652, 670, 925, 926, 938, 941; 148/516, 148/527, 535; 427/585, 252; 455/422.1, 455/450, 552.1; 416/241 R
See application file for complete search history.

(56) References Cited

U.S. PATENT DOCUMENTS

| | | | | | |
|---|---|---|---|---|---|
| 5,482,578 | A * | 1/1996 | Rose et al. | .................. | 148/516 |
| 5,492,726 | A * | 2/1996 | Rose et al. | .................. | 427/252 |
| 5,716,720 | A * | 2/1998 | Murphy | ...................... | 428/623 |
| 5,843,588 | A * | 12/1998 | Rose et al. | .................. | 428/670 |
| 5,856,027 | A | 1/1999 | Murphy | | |
| 6,066,405 | A * | 5/2000 | Schaeffer | .................... | 428/547 |
| 6,395,406 | B1 * | 5/2002 | Sangeeta | .................... | 428/650 |
| 6,485,780 | B1 * | 11/2002 | Sangeeta et al. | ............ | 427/180 |
| 6,589,668 | B1 | 7/2003 | Braithwaite et al. | | |
| 2002/0146587 | A1 | 10/2002 | Schaeffer | | |

FOREIGN PATENT DOCUMENTS

| | | | |
|---|---|---|---|
| EP | 0 718 419 | A2 | 6/1996 |
| EP | 0718419 | A2 | 6/1996 |
| EP | 0784104 | A1 | 7/1997 |
| EP | 0784104 | B1 | 5/2001 |

* cited by examiner

*Primary Examiner*—John J. Zimmerman
*Assistant Examiner*—Aaron Austin
(74) *Attorney, Agent, or Firm*—Crowell & Moring LLP

(57) ABSTRACT

A component having a platinum-aluminum substrate surface region which is formed in the area of the substrate surface of the component by diffusion of platinum and aluminum into the substrate surface and which contains platinum and aluminum as well as the constituents of the substrate composition. The integrated aluminum content and/or the integrated platinum content in the substrate area is less than 18 wt %.

57 Claims, 2 Drawing Sheets

COMPONENT WITH A PLATINUM-ALUMINUM SUBSTRATE AREA, PLATINUM-ALUMINUM COATING AND PRODUCTION METHOD

BACKGROUND OF THE INVENTION

This application claims the priority of German Patent Document No. 103 50 727.2, filed 30 Oct. 2003, the disclosure of which is expressly incorporated by reference therein.

This invention relates to a component with a platinum-aluminum substrate area, in particular a component of a gas turbine. In addition, this invention also relates to a platinum-aluminum coating and a method of producing such a component.

European Patent 0 784 104 B1 relates to a superalloy based on nickel with an optimized platinum-aluminum coating. This prior art discloses an object having a platinum-aluminum surface region, where a nickel-based substrate has first platinum and then aluminum diffused into the substrate surface. This provides a substrate surface region having an integrated aluminum content of 18 to 24 wt % and an integrated platinum content of 18 to 45 wt %, with the remainder comprising constituents of the substrate mass composition. The platinum content and the aluminum content are relatively high in the area adjacent to the substrate surface, decreasing with an increase in the distance from the substrate surface into the substrate. According to European Patent 0 784 104 B1, the integrated values for the aluminum content and the platinum content of the substrate surface region are determined by an integration method, in which the platinum content and the aluminum content are integrated over the distance from the outer substrate surface. A lower integration limit is approx. 2 to 3 μm below the substrate surface. An upper integration limit is determined by the distance from the substrate surface at which the aluminum content measured in wt % has dropped to a value of 18 wt %, starting from a higher value. This upper integration limit is used for determining the integrated aluminum content and also for determining the integrated platinum content.

The platinum-aluminum coating and/or the component having such a coating disclosed in European Patent 0 784 104 B1 has a low ductility. This low ductility is caused by the relatively high aluminum and platinum contents. Because of this low ductility, components coated in this way have a limited thermomechanical fatigue (TMF) resistance. In the case of the blades of gas turbines that are exposed to cyclic thermomechanical stresses due to changes or fluctuations in operating temperature, cracks may develop in materials of limited TMF resistance. This may lead to breakage of the blades. An object of the present invention is thus to improve the TMF resistance.

SUMMARY OF THE INVENTION

This and other objects and advantages are achieved according to the invention by a novel component having a platinum-aluminum substrate surface region, a novel platinum-aluminum coating, and a method of producing such a component.

In an embodiment, the invention provides a component with a platinum-aluminum substrate surface region. The component comprises a component substrate, composed of one or more constituents, having a substrate surface, and a substrate surface region, formed at the substrate surface, the substrate surface region comprising platinum, aluminum, and at least one constituent of the substrate composition, wherein at least one of the integrated aluminum content and the integrated platinum content in the substrate surface region is less than 18 wt %. The substrate surface region can be formed by diffusing platinum and then aluminum into a substrate surface.

In an embodiment, the integrated aluminum (Al) content and/or the integrated platinum (Pt) content in the substrate area is/are less than 18 wt %. By limiting the integrated aluminum content and/or integrated platinum content to a value below 18 wt %, the ductility and thus the TMF resistance are improved.

Desirably, the platinum-aluminum substrate area has an integrated aluminum (Al) content between 10 and 17.99 wt %, and an integrated platinum (Pt) content between 5 and 40 wt %, with the remainder comprising constituents of the substrate composition of the component. An embodiment in which the platinum-aluminum substrate area has an integrated aluminum (Al) content between 10 and 17.99 wt % and an integrated platinum (Pt) content between 5 and 17.99 wt %, with the remainder comprising constituents of the substrate composition of the component is preferred.

According to another embodiment, the invention provides a component having a platinum-aluminum substrate surface region. The component comprises a component substrate having a substrate composition composed of one or more constituents; and a substrate surface region formed at a surface of the component substrate by diffusion of platinum and aluminum into the substrate surface, the substrate surface region comprising platinum, aluminum, and one or more constituents of the substrate composition, wherein at least one of the platinum content and the aluminum content is essentially constant in a zone of the substrate surface region starting from the substrate surface or a point directly beneath the substrate surface to a predetermined depth of the substrate surface region In such an embodiment, the ductility and the TMF resistance of a component can also be increased and thus improved. Note that it is advantageous to form a plateau of at least platinum and preferably also aluminum by keeping the platinum content and preferably also the aluminum content in the substrate area essentially constant, starting from the substrate surface and extending over a certain, i.e., predetermined depth of the substrate area.

The invention also provides a method of producing a component having a platinum-aluminum substrate surface region. The method comprises a) providing a component having a substrate with a substrate surface and a substrate composition composed of one or more constituents, b) diffusing platinum into the substrate surface of the component, and c) diffusing aluminum into the substrate surface of the component subsequent to said diffusion of platinum to form a component with a platinum-aluminum substrate surface region, wherein at least one of the integrated aluminum content and the integrated platinum content in the platinum-aluminum substrate surface region is less than 18 wt %.

In still another embodiment, the invention provides a method of producing a component having a platinum-aluminum substrate surface region. The method comprises a) providing a component having a substrate with a substrate surface and a substrate composition composed of one or more constituents, b) diffusing platinum into the substrate surface, and c) diffusing aluminum into the substrate surface subsequent to said diffusion of platinum so that at least one of the aluminum content and the platinum content is essentially constant in a zone of the substrate surface region starting from the substrate surface or a point directly beneath the substrate surface to a predetermined depth in the substrate surface region.

Additionally, the invention provides a platinum aluminum coating for a component having a substrate composed of one or more constituents, the coating comprising a substrate surface region composed of platinum, aluminum, and at least one constituent of the substrate composition, wherein at least one of the integrated aluminum content and the integrated platinum content in the surface layer is less than 18 wt %.

The invention further provides a platinum-aluminum coating for a component having a substrate, wherein the substrate is composed of one or more constituents and the coating is formed by diffusing platinum and aluminum into a surface of the substrate to form a substrate surface region containing platinum, aluminum, and at least one constituent of the substrate composition, and wherein at least one of the aluminum content and the platinum content remain essentially constant in a zone of the substrate surface region starting from the substrate surface or a point directly below the substrate surface to a predetermined depth.

Other objects, advantages and novel features of the present invention will become apparent from the following detailed description of the invention when considered in conjunction with the accompanying drawings.

DETAILED DESCRIPTION OF THE EMBODIMENTS

Figure 1:
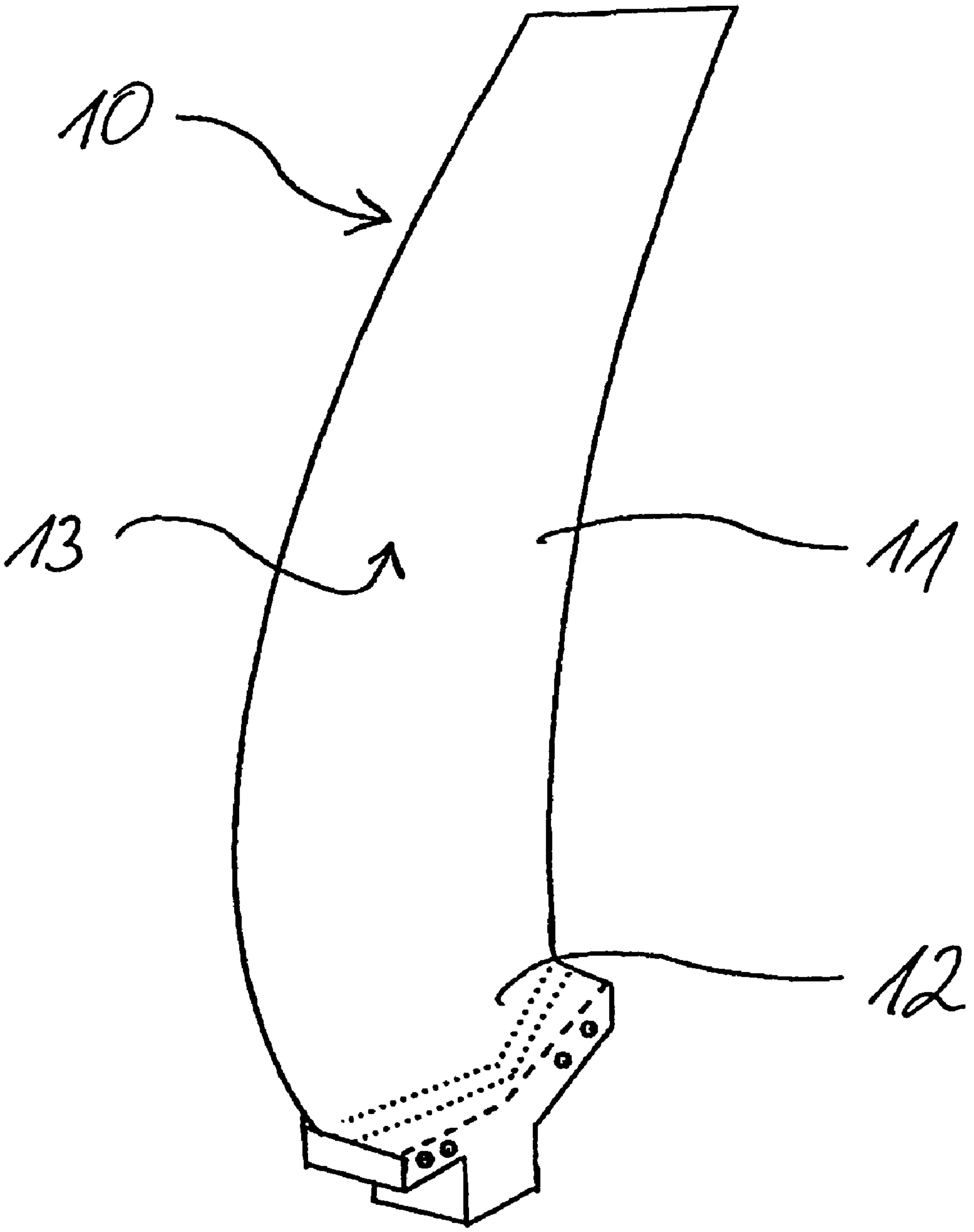
FIG. 1 depicts a component designed according to this invention.

The present invention is described in greater detail below with reference to FIGS. 1 and 2. FIG. 1 shows a blade 10 of a gas turbine, namely an aircraft engine. The blade 10 has a blade edge 11 and a blade footing 12.

In the exemplary embodiment depicted here, the blade 10 is coated over the area of its entire surface 13. The coating in the surface region of the surface 13 is formed by diffusion of platinum and aluminum into the surface 13. The blade 10 thus forms a substrate for the coating, with the surface 13 also being referred to as the substrate surface. Blades 10 for gas turbines usually have a mass composition based on a nickel alloy or titanium alloy. The mass composition of the blade 10 and/or the substrate is also referred to as the substrate composition. Due to the diffusion of platinum and aluminum into the surface 13 of the blade 10 or into the substrate surface of the substrate, a platinum-aluminum substrate surface region is formed in the vicinity of the substrate surface, whereby this surface region contains both platinum and aluminum as well as the constituents of the substrate composition and/or the mass composition of the blade 10.

Preferably, the integrated aluminum content and/or the integrated platinum content in the substrate surface region should be less than 18 wt %.

In an embodiment, the integrated aluminum content in the substrate surface region is between 10 and 17.99 wt % and the integrated platinum content in the substrate surface region is between 5 and 40 wt %. Due to the restriction on the integrated aluminum content to max. 17.99 wt %, the TMF resistance of the coated component is improved significantly. Since the concentration and/or the amount of aluminum in the substrate area has a greater influence than the platinum content on the TMF resistance, the integrated platinum content may amount to as much as 40 wt % if the integrated aluminum content in the substrate surface region is limited to max. 17.99 wt %. Such a coating is not only characterized by a good TMF resistance but also provides effective protection against oxidation and corrosion.

According to an alternative embodiment of the invention, the integrated aluminum content in the substrate surface region is between 10 and 24 wt % and the integrated platinum content in the substrate surface region is between 5 and 17.99 wt %. If the integrated platinum content can be reduced to 17.99 wt % in this way, the integrated aluminum content may be up to 24 wt %.

A platinum-aluminum substrate surface region, in which the integrated aluminum content in the substrate area is between 10 and 17.99 wt % and the integrated platinum content is between 5 and 17.99 wt %, is particularly preferred. Since the integrated aluminum and platinum contents are preferably less than 18 wt % each, the TMF resistance of the coating and/or the substrate surface region and/or the component having such a substrate surface region can be further improved.

The aluminum and platinum contents in the substrate surface region given above are integrated contents. The integrated contents are determined by an integration method. In this integration method, the aluminum and platinum contents are integrated over the distance from the outer substrate surface, with the amounts of platinum and aluminum being dependent upon the distance from and/or the depth in relation to the outermost substrate surface. This can be seen in FIG. 2 in particular.

Figure 2:
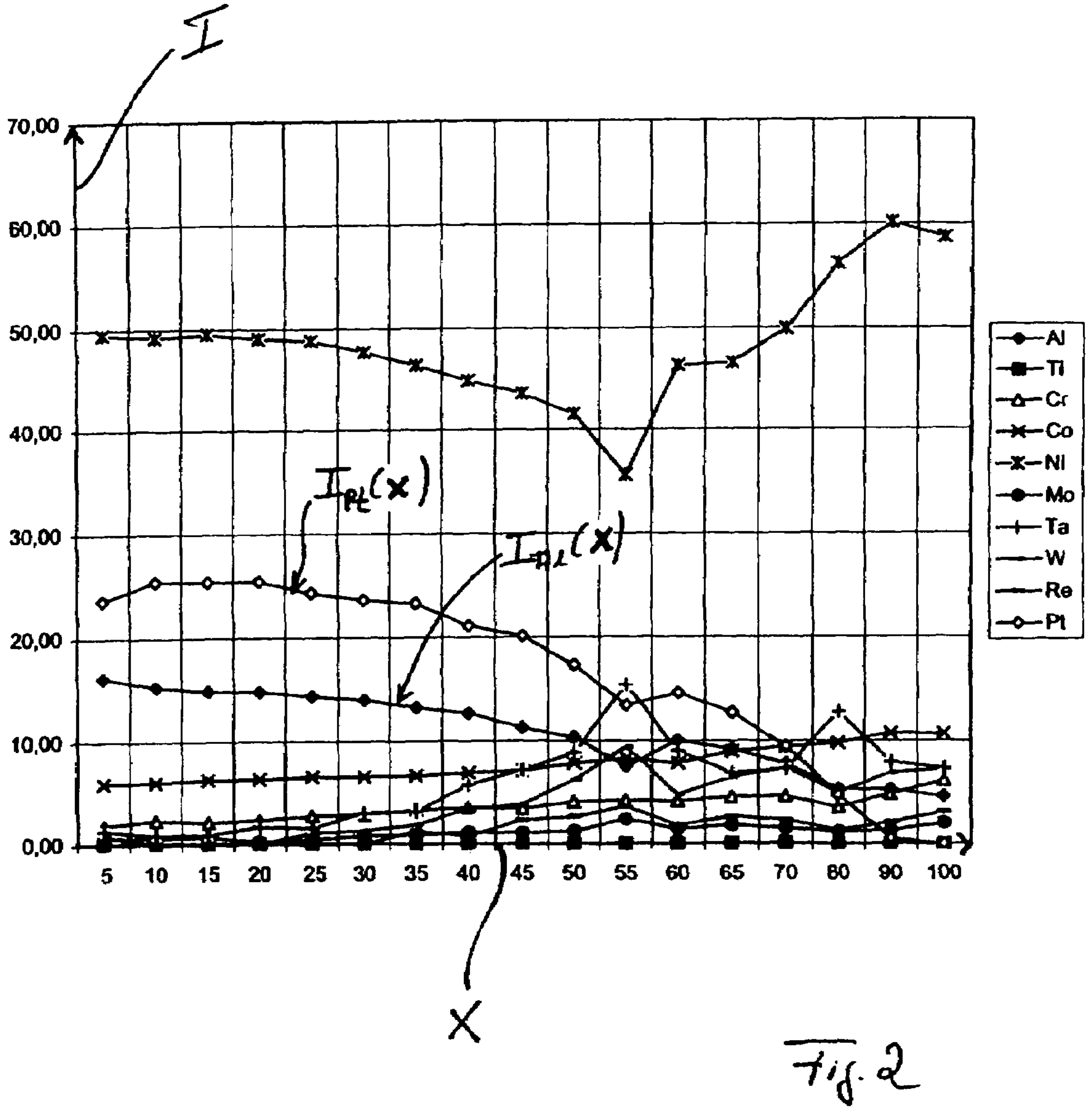
FIG. 2 provides a diagram illustrating an embodiment of the platinum-aluminum substrate surface region of a component according to the invention.

FIG. 2 shows the amounts of the individual elements of the composition of the inventive platinum-aluminum substrate surface region plotted as a function of the layer thickness, i.e., the depth, i.e., distance from the outer substrate surface. The distance x from the outer substrate surface in micrometers (μm) is plotted on the horizontal axis of the diagram in FIG. 2; the amounts I, in particular $I_{Al}$ and $I_{Pt}$, of the individual elements of the platinum-aluminum substrate area are given in wt % on the vertical axis in the diagram in FIG. 2.

It follows directly from FIG. 2 that the aluminum and platinum contents in the substrate surface region depend on the distance x, i.e., the depth, in relation to the outer substrate surface. In this invention, the lower integration limit is formed either by the substrate surface itself or by a point directly beneath the substrate surface. In the case when the lower integration limit is formed by the substrate surface itself, $x_{min}=0$ μm; in the case when the lower integration limit is formed by a point directly beneath the substrate surface, $x_{min}$ is preferably 5 μm. An upper integration limit $x_{max}$ is formed by the distance, i.e., the depth, with respect to the substrate surface at which the platinum content has dropped to 5 wt % and the aluminum content has also dropped to 8 wt %, and both remain beneath these stated limits in the remaining course. This upper integration limit $x_{max}$ is used for determining both the integrated aluminum content and the integrated platinum content. The value of the integral is then divided by the difference between the upper integration limit $x_{max}$ and the lower integration limit $x_{min}$, so the following equation holds for the determination of the integral mean values of aluminum and platinum:

$$\bar{I}_{Al-int} = \frac{1}{x_{\max} - x_{\min}} * \int_{x_{\min}}^{x_{\max}} I_{Al}(x)\,dx$$

-continued $$\bar{I}_{Pt-int} = \frac{1}{x_{max} - x_{min}} * \int_{x_{min}}^{x_{max}} I_{Pt}(x)\,dx$$

where:

$\bar{I}_{Pt-int}$=integral mean of platinum $\bar{I}_{Al-int}$=integral mean of aluminum $I_{Pt(x)}$=platinum content as a function of x $I_{Al(x)}$=aluminum content as a function of x x=distance, i.e., depth, from the outer substrate surface $x_{min}$=lower integration limit $x_{max}$=upper integration limit The value of the integrated aluminum (Al) content determined by the above integration method amounts to 12 wt % for the exemplary embodiment depicted in FIG. 2, while the integrated platinum (Pt) content amounts to 19 wt %. For the exemplary embodiment in FIG. 2, the integrated aluminum content in the substrate area is thus less than 18 wt %.

The concrete exemplary embodiment of a component with a platinum-aluminum substrate surface region depicted graphically in FIG. 2 relates to a component having a mass composition and/or a substrate composition based on a nickel alloy. The amounts of aluminum, platinum and the constituents of the substrate composition on which FIG. 2 is based are summarized in the table below.

| | Al | Ti | Cr | Co | Ni | Mo | Ta | W | Re | Pt |
|---|---|---|---|---|---|---|---|---|---|---|
| 5 | 16.19 | 0.06 | 1.85 | 5.95 | 49.52 | 0.65 | 1.32 | 0.83 | 0.00 | 23.63 |
| 10 | 15.29 | 0.10 | 2.35 | 6.04 | 49.19 | 0.64 | 0.89 | 0.00 | 0.07 | 25.43 |
| 15 | 14.88 | 0.03 | 2.14 | 6.30 | 49.53 | 0.72 | 0.93 | 0.07 | 0.00 | 25.40 |
| 20 | 14.82 | 0.07 | 2.34 | 6.33 | 49.09 | 0.23 | 1.68 | 0.00 | 0.00 | 25.45 |
| 25 | 14.34 | 0.05 | 2.75 | 6.55 | 48.82 | 0.49 | 1.57 | 1.13 | 0.00 | 24.30 |
| 30 | 13.97 | 0.05 | 2.88 | 6.56 | 47.73 | 0.80 | 3.07 | 1.31 | 0.00 | 23.63 |
| 35 | 13.22 | 0.00 | 3.30 | 6.65 | 46.38 | 0.90 | 3.13 | 1.88 | 1.25 | 23.29 |
| 40 | 12.65 | 0.00 | 3.54 | 6.91 | 44.83 | 1.11 | 5.74 | 3.37 | 0.73 | 21.13 |
| 45 | 11.27 | 0.00 | 3.43 | 7.14 | 43.57 | 1.06 | 7.20 | 3.85 | 2.33 | 20.15 |
| 50 | 10.35 | 0.02 | 4.09 | 7.81 | 41.53 | 1.24 | 8.81 | 6.22 | 2.62 | 17.32 |
| 55 | 7.53 | 0.04 | 4.27 | 8.30 | 35.61 | 2.42 | 15.39 | 9.40 | 3.63 | 13.41 |
| 60 | 10.02 | 0.05 | 4.16 | 7.86 | 46.26 | 1.47 | 8.99 | 4.81 | 1.83 | 14.56 |
| 65 | 9.15 | 0.12 | 4.57 | 8.95 | 46.53 | 1.86 | 6.91 | 6.49 | 2.68 | 12.72 |
| 70 | 7.82 | 0.11 | 4.66 | 9.41 | 49.92 | 1.54 | 7.34 | 7.39 | 2.35 | 9.47 |
| 80 | 5.35 | 0.01 | 3.57 | 9.77 | 56.19 | 1.21 | 12.77 | 5.02 | 1.34 | 4.77 |
| 90 | 5.32 | 0.07 | 4.87 | 10.73 | 60.10 | 1.33 | 7.97 | 6.93 | 2.11 | 0.57 |
| 100 | 4.64 | 0.00 | 6.18 | 10.63 | 58.68 | 2.04 | 7.41 | 7.30 | 3.11 | 0.00 |

As shown by the exemplary embodiment according to FIG. 2, the platinum content and the aluminum content remain essentially constant over the depth of the substrate surface region and/or the distance from the substrate surface, namely starting from the substrate surface or a point directly beneath the substrate surface and continuing to a predetermined depth. This predetermined depth amounts to at least 20%, preferably at least 30%, especially preferably at least 40% of the upper integration limit $x_{max}$ described above. The upper integration limit $x_{max}$ is formed as described above by the distance, i.e., by the depth, with respect to the substrate surface at which the platinum content has dropped to 5 wt % and also the aluminum content has dropped to 8 wt %, and both remain below these stated limits in the remaining course.

Starting from the substrate surface or a point directly beneath the substrate surface, at least the upper half of the above substrate surface region, which is limited on the one side by the substrate surface or a point directly beneath the substrate surface and on the other side by the upper integration limit $x_{max}$, is primarily (i.e., more than 50%) in the β-NiAl structure.

In the exemplary embodiment depicted here, the upper integration limit $x_{max}$ is at approx. 80 μm. The platinum content and the aluminum content in the exemplary embodiment depicted here are thus essentially constant down to a depth of at least approx. 16 μm, preferably at least approx. 24 μm, especially preferably at least approx. 32 μm.

In this invention, the aluminum content and the platinum content should be regarded as essentially constant if the fluctuation about the amount prevailing at 5 μm amounts to maximally approx. ±10%. A maximum fluctuation of ±7.5% about the content at 5 μm is preferred, however, and a maximum fluctuation of ±5% is especially preferred.

In the exemplary embodiment depicted in FIG. 2, a maximum fluctuation of approx. ±10% is maintained in the case of platinum down to a depth of approx. 40 μm (50% of $x_{max}$) from the substrate surface. For aluminum, a maximum fluctuation of approx. ±10% is maintained down to a depth of approx. 25 μm (32% of $x_{max}$) from the substrate surface in the exemplary embodiment depicted in FIG. 2.

In the exemplary embodiment shown here, the aluminum content at 5 μm amounts to 16.19 wt %. The platinum content at 5 μm in the exemplary embodiment shown here is 23.63 wt %. The precise percentage deviations can be calculated from the table given above. Thus the following holds:

The percentage deviation of the aluminum content based on the aluminum content prevailing at 5 μm amounts to approx. 5.5% at 10 μm, approx. 8.1% at 15 μm, approx. 8.4% at 20 μm, approx. 11.4% at 25 μm, approx. 13.7% at 30 μm, approx. 18.3% at 35 μm and approx. 21.8% at 40 μm.

The percentage deviation in the platinum content based on the platinum content prevailing at 5 μm amounts to approx. 7.6% at 10 μm, approx. 7.5% at 15 μm, approx. 7.7% at 20 μm, approx 2.8% at 25 μm, approx. 0% at 30 μm, approx. 1.4% at 35 μm and approx. 10.5% at 40 μm.

Due to the essentially constant aluminum and platinum contents in the substrate surface region, a plateau is formed for both aluminum and platinum in this substrate surface region. This is another distinguishing criterion of an embodiment of the present invention in comparison with the platinum-aluminum substrate and/or corresponding coatings known from the prior art. Thus with the platinum-aluminum substrate surface regions known from the prior art, the aluminum content and the platinum content, starting from the substrate surface, decline significantly and rapidly with increasing depth, i.e., substrate area depth. The present invention thus has the advantage that a platinum-aluminum substrate surface region with an essentially unchanged composition and thus essentially unchanged properties is created over a relatively large substrate area depth. Thus the platinum-aluminum coating and/or the platinum-aluminum substrate surface region still fulfills its function in the present invention even if there should be abrasion of the material at the surface of the component and/or in the substrate surface region.

Another embodiment of a component having a platinum-aluminum substrate surface region according to the invention also relates to a component having a mass composition and/or a substrate composition based on a nickel alloy. The amounts of aluminum, platinum and the constituents of the substrate composition for this additional embodiment are summarized in the following table.

For diffusion of aluminum, coating granules with a low activity are used. This means that the aluminum content in the granules is relatively low. During coating, which is preferably performed as gas-phase coating in a closed coating space, the coating activity near the substrate surface that is to be coated is preferably kept essentially constant over the entire coating time by circulation of gas. This can be facilitated by the gas circulation in the coating space. Coating with a low and nevertheless approximately constant activity near the substrate surface to be coated permits the development of a plateau of aluminum and platinum in the substrate area.

It should be pointed out that in the exemplary embodiment shown here, not only is the integrated aluminum content less than 18 wt % but instead the aluminum content over the entire depth of the substrate surface region of the platinum-aluminum substrate area is less than 18 wt %. The platinum content in the exemplary embodiment depicted here is always less than 24 wt %.

| | Al | Ti | Cr | Co | Ni | Mo | Ta | W | Re | Pt |
|---|---|---|---|---|---|---|---|---|---|---|
| 5 | 18.94 | 0.00 | 2.18 | 6.56 | 57.83 | 0.33 | 0.08 | 0.22 | 0.00 | 13.86 |
| 10 | 18.29 | 0.01 | 2.35 | 6.28 | 56.42 | 0.56 | 1.03 | 0.18 | 0.00 | 14.86 |
| 15 | 17.39 | 0.05 | 2.54 | 6.75 | 56.09 | 0.40 | 0.63 | 0.53 | 0.00 | 15.61 |
| 20 | 17.02 | 0.00 | 2.67 | 6.70 | 52.48 | 0.57 | 2.45 | 0.49 | 1.16 | 16.48 |
| 25 | 16.18 | 0.04 | 2.89 | 7.11 | 54.54 | 0.71 | 1.95 | 1.09 | 0.29 | 15.19 |
| 30 | 15.37 | 0.00 | 2.98 | 7.15 | 50.38 | 0.85 | 3.84 | 2.46 | 1.32 | 15.65 |
| 35 | 13.47 | 0.00 | 4.02 | 7.70 | 47.98 | 1.60 | 4.12 | 5.37 | 2.46 | 13.28 |
| 40 | 11.70 | 0.22 | 3.95 | 8.14 | 44.92 | 1.13 | 12.24 | 5.60 | 0.63 | 11.46 |
| 45 | 11.01 | 0.00 | 4.36 | 7.83 | 42.89 | 1.72 | 11.99 | 6.42 | 2.92 | 10.86 |
| 50 | 10.27 | 0.09 | 4.23 | 8.48 | 40.93 | 1.46 | 13.54 | 8.91 | 2.01 | 10.09 |
| 55 | 10.07 | 0.00 | 5.13 | 9.02 | 43.65 | 1.90 | 11.50 | 8.79 | 2.15 | 7.80 |
| 65 | 5.70 | 0.00 | 5.28 | 9.48 | 39.90 | 2.91 | 18.26 | 10.50 | 3.38 | 4.60 |
| 75 | 6.49 | 0.01 | 5.25 | 10.04 | 53.51 | 1.72 | 7.78 | 7.92 | 3.67 | 3.62 |
| 85 | 4.67 | 0.00 | 5.36 | 9.97 | 60.29 | 1.31 | 8.58 | 7.90 | 1.91 | 0.00 |

For this exemplary embodiment, the integrated aluminum (Al) content is 13 wt % and the integrated platinum (Pt) content is also 13 wt %. Thus the integrated aluminum and platinum contents in this substrate surface region each amount to less than 18 wt % in this exemplary embodiment.

The inventive coating described in detail above is suitable in particular as a corrosion protection layer, in particular as a hot gas and heat corrosion layer.

In an embodiment of a method according to the invention, the procedure followed to produce the inventive component, i.e., the inventive platinum-aluminum coating, is to first provide a component that is to be coated, namely in the exemplary embodiment shown here, a blade 10 of a gas turbine, where this blade is to be coated and has a substrate composition and a substrate surface. Then platinum is diffused into the substrate surface. After diffusion of platinum into the substrate surface, aluminum is diffused into it. Thus the diffusion of platinum and the subsequent diffusion of aluminum are performed in successive process steps.

The diffusion of platinum and aluminum is performed so that first, the integrated aluminum content and/or the integrated platinum content in the platinum-aluminum substrate surface region formed by the coating is less than 18 wt % and furthermore the aluminum content and/or platinum content in the developing substrate surface region is essentially constant, starting from the substrate surface or a point near the surface and continuing over a predetermined depth of the substrate surface region.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A component with a platinum-aluminum substrate surface region comprising:

a component substrate, having a composition based on a nickel alloy or a titanium alloy and composed of one or more constituents, and having a substrate surface; and a substrate surface region at the component surface formed by diffusion of platinum and aluminum into the substrate surface, the substrate surface region comprising platinum, aluminum, and at least one constituent of the substrate composition, wherein at least one of the platinum content and the aluminum content is essentially constant in a zone of the substrate surface region, and said zone comprises at least 20% of a region bounded on one side by the substrate surface or a point directly beneath the substrate surface, and bounded on the other side by a region depth at which the platinum content is 5 wt % or less, the aluminum content is 8 wt % or less, and the platinum content and the aluminum content remain below 5 wt % and 8 wt %, respectively, beyond the region depth, wherein the integrated aluminum content in the substrate surface region is less than 18 wt %.

2. A component with a platinum-aluminum substrate surface region comprising:

a component substrate, composed of one or more constituents, having a substrate surface; and a substrate surface region at the component surface, the substrate surface region comprising platinum, aluminum, and at least one constituent of the substrate composition, wherein at least one of the platinum content and the aluminum content is essentially constant in a zone of the substrate surface region, and said zone comprises at least 20% of a region bounded on one side by the substrate surface or a point directly beneath the substrate surface, and bounded on the other side by a region depth at which the platinum content is 5 wt % or less, the aluminum content is 8 wt % or less, and the platinum content and the aluminum content remain below 5 wt % and 8 wt %, respectively, beyond the region depth, wherein the integrated aluminum content in the substrate surface region is less than 18 wt %.

3. A component as claimed in claim 2, wherein the component is a gas turbine component.

4. A component as claimed in claim 2, wherein the integrated aluminum content in the substrate surface region is between 10 wt % and 17.99 wt %, and the integrated platinum content in the substrate surface region is between 5 wt % and 40 wt %.

5. A component as claimed in claim 2, wherein the integrated platinum content in the substrate surface region is between 5 wt % and 17.99 wt % and the integrated aluminum content in the substrate surface region is between 10 wt % and 24 wt %.

6. A component as claimed in claim 2, wherein the integrated aluminum content in the substrate surface region is between 10 wt % and 17.99 wt % and the integrated platinum content in the substrate surface region is between 5 wt % and 17.99 wt %.

7. A component as claimed in claim 2, wherein the substrate surface region comprises a region bounded on one side by the component surface or a point directly beneath the component surface, and bounded on the other side by a substrate surface region depth at which the platinum content is 5 wt % or less, the aluminum content is 8 wt % or less, and both the platinum content and the aluminum content remain below the values of 5 wt % and 8 wt %, respectively, beyond said substrate surface region depth, and wherein, starting at the component surface or at the point directly beneath the component surface, at least an upper half of the substrate surface region is more than 50% in the form of a β-NiAl structure.

8. A component as claimed in claim 2, wherein the component is a gas turbine component, and wherein the constituents of the substrate composition comprise a nickel alloy or a titanium alloy.

9. The component of claim 8, wherein the component is an aircraft engine gas turbine component.

10. The component of claim 8, wherein the component is a blade of a gas turbine.

11. A platinum aluminum coating for a component having a substrate composed of one or more constituents, the coating comprising a substrate surface region composed of platinum, aluminum, and at least one constituent of the substrate composition, wherein the integrated aluminum content in a surface layer is less than 18 wt % and wherein at least one of the platinum content and the aluminum content is essentially constant in a zone of the substrate surface region and said zone comprises at least 20% of a region bounded on one side by the substrate surface or a point directly beneath the substrate surface, and bounded on the other side by a region depth at which the platinum content is 5 wt % or less, the aluminum content is 8 wt % or less, and the platinum content and the aluminum content remain below 5 wt % and 8 wt %, respectively, beyond the region depth.

12. A coating as claimed in claim 11, wherein the coating is formed by diffusion of platinum and aluminum into a surface of the substrate.

13. A coating as claimed in claim 11, wherein the integrated aluminum content in the substrate surface region is between 10 wt % and 17.99 wt % and the integrated platinum content in the substrate surface region is between 5 wt % and 40 wt %.

14. A coating as claimed in claim 11, wherein the integrated platinum content in the substrate surface region is between 5 wt % and 17.99 wt % and the integrated aluminum content in the substrate surface region is between 10 wt % and 24 wt %.

15. A coating as claimed in claim 11, wherein the integrated aluminum content in the substrate surface region is between 10 wt % and 17.99 wt % and the integrated platinum content in the substrate surface region is between 5 wt % and 17.99 wt %.

16. A method of preventing corrosion of a component comprising forming a coating as claimed in claim 11 on a component substrate.

17. A method of preventing hot-gas corrosion of a component comprising forming a coating as claimed in claim 11 on a component substrate.

18. A method of producing a component having a platinum-aluminum substrate surface region, comprising:

a) providing a component having a substrate with a substrate surface and a substrate composition composed of one or more constituents;

b) diffusing platinum into the substrate surface of the component; and c) diffusing aluminum into the substrate surface of the component subsequent to said diffusion of platinum to form a component with a platinum-aluminum substrate surface region, wherein the integrated aluminum content in the platinum-aluminum substrate surface region is less than 18 wt % wherein said steps of diffusing are performed so that at least one of the aluminum content and the platinum content is essentially constant in a zone of the substrate surface region and said zone comprises at least 20% of a region bounded on one side by the substrate surface or a point directly beneath the substrate surface, and bounded on the other side by a region depth at which the platinum content is 5 wt % or less, the aluminum content is 8 wt % or less, and the platinum content and the aluminum content remain below 5 wt % and 8 wt %, respectively, beyond the region depth.

19. A method as claimed in claim 18, wherein the platinum-aluminum substrate surface region has an integrated aluminum content between 10 wt % and 17.99 wt %, an integrated platinum content between 5 wt % and 40 wt %, with a remainder of the substrate surface region comprising at least one constituent of the substrate composition.

20. A method as claimed in claim 18, wherein the platinum-aluminum substrate surface region has an integrated aluminum content greater than 10 wt %, an integrated platinum content between 5 wt % and 17.99 wt % with the remainder comprising at least one constituent of the substrate composition.

21. A method as claimed in claim 18, wherein the platinum-aluminum substrate surface region has an integrated aluminum content between 10 wt % and 17.99 wt %, an integrated platinum content between 5 wt % and 17.99 wt % with the remainder comprising at least one constituent of the substrate composition.

22. A method as claimed in claim 18, wherein a gas turbine component is provided as the component.

23. A method as claimed in claim 22, further comprising the step of installing the gas turbine component, wherein at least one of the aluminum content and the platinum content is essentially constant in a zone of the substrate surface region, as a blade of an aircraft engine wherein the integrated aluminum content in the platinum-aluminum substrate surface region of the gas turbine component is less than 18 wt %.

24. A method as claimed in claim 22, wherein a component having a substrate composition based on a nickel alloy or a titanium alloy is provided.

25. A component having a platinum-aluminum substrate surface region, comprising:

a component substrate having a substrate composition composed of one or more constituents; and a substrate surface region formed at a surface of the component substrate by diffusion of platinum and aluminum into the substrate surface, the substrate surface region comprising platinum, aluminum, and one or more constituents of the substrate composition, wherein at least one of the platinum content and the aluminum content is essentially constant in a zone of the substrate surface region and said zone comprises at least 20% of a region bounded on one side by the substrate surface or a point directly beneath the substrate surface, and bounded on the other side by a region depth at which the platinum content is 5 wt % or less, the aluminum content is 8 wt % or less, and the platinum content and the aluminum content remain below 5 wt % and 8 wt %, respectively, beyond the region depth.

26. A component as claimed in claim 25, wherein the component is a gas turbine component.

27. A component as claimed in claim 25, wherein the platinum content in said zone of the substrate surface region varies by a maximum of ±10%.

28. A component as claimed in claim 27, wherein the platinum content in said zone of the substrate surface region varies by a maximum of ±7.5%.

29. A component as claimed in claim 27, wherein the platinum content in said zone of the substrate surface region varies by a maximum of ±5%.

30. A component as claimed in claim 25, wherein the platinum content is essentially constant in said zone and said zone comprises at least 30% of a region bounded on one side by the substrate surface or a point directly beneath the substrate surface, and bounded on the other side by a region depth at which the platinum content is 5 wt % or less, the aluminum content is 8 wt % or less, and the platinum content and the aluminum content remain below 5 wt % and 8 wt %, respectively, beyond the region depth.

31. A component as claimed in claim 30, wherein said zone comprises at least 40% of said bounded region.

32. A component as claimed in claim 25, wherein the point directly beneath the substrate surface is at a depth of approximately 5 μm beneath the substrate surface.

33. A component as claimed in claim 25, wherein the aluminum content is less than 18 wt % throughout the substrate surface region.

34. A component as claimed in claim 25, wherein the aluminum content in said zone of the substrate surface region varies by a maximum of ±10%.

35. A component as claimed in claim 34, wherein the aluminum content in said zone of the substrate surface region varies by a maximum of ±7.5%.

36. A component as claimed in claim 34, wherein the aluminum content in said zone of the substrate surface region varies by a maximum of ±5%.

37. A component as claimed in claim 25, wherein the aluminum content is essentially constant in said zone and said zone comprises at least 20% of a region bounded on one side by the substrate surface or a point directly beneath the substrate surface, and bounded on the other side by a region depth at which the platinum content is 5 wt % or less, the aluminum content is 8 wt % or less, and the platinum content and the aluminum content remain below 5 wt % and 8 wt %, respectively, beyond the region depth.

38. A component as claimed in claim 25, wherein the aluminum content is essentially constant in said zone and said zone comprises at least 30% of a region bounded on one side by the substrate surface or a point directly beneath the substrate surface, and bounded on the other side by a region depth at which the platinum content is 5 wt % or less, the aluminum content is 8 wt % or less, and the platinum content and the aluminum content remain below 5 wt % and 8 wt %, respectively, beyond the region depth.

39. A component as claimed in claim 38, wherein said zone comprises at least 40% of said bounded region.

40. A component as claimed in claim 25, wherein the substrate surface region comprises a region bounded on one side by the substrate surface or a point directly beneath the substrate surface, and bounded on the other side by a substrate surface region depth at which the platinum content is 5 wt % or less, the aluminum content is 8 wt % or less, and both the platinum content and the aluminum content remain below the values of 5 wt % and 8 wt %, respectively, beyond the substrate surface region depth, and wherein, starting at the substrate surface or at the point directly beneath the substrate surface, at least an upper half of the substrate surface region is more than 50% in the form of a β-NiAl structure.

41. A platinum-aluminum coating for a component having a substrate, wherein the substrate is composed of one or more constituents and the coating is formed by diffusing platinum and aluminum into a surface of the substrate to form a substrate surface region containing platinum, aluminum, and at least one constituent of the substrate composition, and wherein at least one of the aluminum content and the platinum content remain essentially constant in a zone of the substrate surface region and said zone comprises at least 20% of a region bounded on one side by the substrate surface or a point directly beneath the substrate surface, and bounded on the other side by a region depth at which the platinum content is 5 wt % or less, the aluminum content is 8 wt % or less, and the platinum content and the aluminum content remain below 5 wt % and 8 wt %, respectively, beyond the region depth.

42. A platinum-aluminum coating as claimed in claim 41, wherein the component is a gas turbine component.

43. A platinum-aluminum coating as claimed in claim 41, wherein at least one of the platinum content and the aluminum content in said zone of the substrate surface region varies by a maximum of ±10%.

44. A platinum-aluminum coating as claimed in claim 41, wherein at least one of the platinum content and the aluminum content in said zone of the substrate surface region varies by a maximum of ±7.5%.

45. A platinum-aluminum coating as claimed in claim 41, wherein at least one of the platinum content and the aluminum content in said zone of the substrate surface region varies by a maximum of ±5%.

46. A platinum-aluminum coating as claimed in claim 41, wherein said zone comprises at least 30% of said bounded region.

47. A platinum-aluminum coating as claimed in claim 41, wherein the substrate surface region comprises a region bounded on one side by the substrate surface or a point directly beneath the substrate surface, and bounded on the other side by a substrate surface region depth at which the platinum content is 5 wt % or less, the aluminum content is 8 wt % or less, and both the platinum content and the aluminum content remain below the values of 5 wt % and 8 wt %, respectively, beyond the substrate surface region depth, and wherein, starting at the substrate surface or at the point directly beneath the substrate surface, at least an upper half of the substrate surface region is more than 50% in the form of a β-NiAl structure.

48. A method of preventing corrosion of a component comprising forming a coating as claimed in claim 41 on a component substrate.

49. A method of preventing hot-gas corrosion of a component comprising forming a coating as claimed in claim 41 on a component substrate.

50. A method of producing a component having a platinum-aluminum substrate surface region, comprising:

a) providing a component having a substrate with a substrate surface and a substrate composition composed of one or more constituents, b) diffusing platinum into the substrate surface, c) diffusing aluminum into the substrate surface subsequent to said diffusion of platinum so that at least one of the aluminum content and the platinum content is essentially constant in a zone of the substrate surface region and said zone comprises at least 20% of a region bounded on one side by the substrate surface or a point directly beneath the substrate surface, and bounded on the other side by a region depth at which the platinum content is 5 wt % or less, the aluminum content is 8 wt % or less, and the platinum content and the aluminum content remain below 5 wt % and 8 wt %, respectively, beyond the region depth.

51. A method according to claim 50, wherein at least one of the platinum content and the aluminum content in said zone of the substrate surface region varies by a maximum of ±10%.

52. A method according to claim 50, wherein at least one of the platinum content and the aluminum content in said zone of the substrate surface region varies by a maximum of ±7.5%.

53. A method according to claim 50, wherein at least one of the platinum content and the aluminum content in said zone of the substrate surface region varies by a maximum of ±5%.

54. A method as claimed in claim 50, wherein said diffusion of aluminum into the substrate surface is performed so that said zone of the substrate surface region comprises at least 20% of a region bounded on one side by the substrate surface or a point directly beneath the substrate surface, and bounded on the other side by a region depth at which the platinum content is 5 wt % or less, the aluminum content is 8 wt % or less, and both the platinum content and the aluminum content remain below the values of 5 wt % and 8 wt %, respectively, beyond the region depth.

55. The method of claim 54, wherein said zone comprises at least 30% of the bounded region.

56. The method of claim 54, wherein said zone comprises at least 40% of the bounded region.

57. A method as claimed in claim 50, wherein coating granules with a low activity are used for said diffusion of platinum and subsequent diffusion of aluminum, and wherein the activity of the coating granules near the substrate surface that is to be coated is kept essentially constant over the entire coating time.

* * * * *